March 16, 1971     G. BERGSON     3,570,826

GAS-LIQUID-SOLID CONTACT DEVICE

Filed July 5, 1966

SECTION A-A

INVENTOR,

GUSTAV BERGSON

United States Patent Office 3,570,826
Patented Mar. 16, 1971

3,570,826
GAS-LIQUID-SOLID CONTACT DEVICE
Gustav Bergson, Apt. 319 Benson Apartments,
Jenkintown, Pa. 19046
Filed July 5, 1966, Ser. No. 562,837
Int. Cl. B01f 3/04
U.S. Cl. 261—122
6 Claims

ABSTRACT OF THE DISCLOSURE

Gas-liquid-solid contact device has an enclosure defined by top and bottom walls of porous material, side walls of a non-wettable material and discrete solid particles contained therein. The space between the discrete particles is filled with a liquid. Gas passed through the device thereby contacts the liquid-solid medium along maximum contact surface.

---

It is important in some operations where a gas is passing in contact with a liquid, or with a liquid and a solid, the latter being possibly in the form of a powder, to obtain a maximum contact between the gas and either the liquid, or the liquid and the solid, at minimum cost.

An example where maximum contact between a passing gas and a liquid is desired would occur under conditions where one is trying to humidify, or wet, the gas and it is desired that the gas will be wetted to a condition that would correspond to saturation at the particular temperature. Another way of saying this is that the gas shall reach a condition, with respect to the vapor of the liquid, which approaches the dewpoint for the vapor at the particular temperature.

An example where it is desired to obtain maximum contact between a passing gas, a liquid and a powdered solid would be under conditions where the solid is a silver powder, having an external electrical connection, the liquid is a solution of potassium hydroxide, and the passing gas contains oxygen. Under these conditions, the molecular gaseous oxygen can be reduced to become part of hydroxyl ion in the liquid and the current flowing in the external circuit becomes a measure of the amount of passing oxygen whereby the location of this action is commonly termed a cathode and the remainder of the oxydation-reduction cell can take a form well known to those working in this field. The cathode terminology may be associated with the fact that electrons are given up at this point. Quite generally, in this type of application, the gaseous molecular oxygen leaves the carrier, or main gas, at the cathode location and passes through the cell in chemical combination to revert to molecular oxygen, and rejoin the main gas, at an exit electrode, generally termed an anode.

Figure 1:
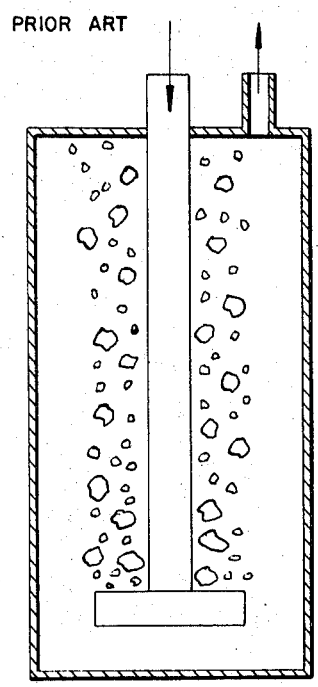

In present practice when it is desired to wet a gas with a liquid the gas is broken into fine bubbles in what is known as a sparger, see FIG. 1, and the liquid evaporates into the gaseous bubbles as these pass through, the closeness of approach to ultimate saturation being dependent on the length of time spent by the bubbles in passing through the liquid, their size, and the rate of evaporation of the liquid into the bubbles.

The size of the bubbles is important because the passage of the liquid into the vapor state as part of the bubbles is a surface phenomenon and for a given volume of gas, the amount of surface will be greater, the smaller the bubbles. Difficulties arise in practice when one tries to produce streams of very fine bubbles, in sparging, due to the tendency of the bubbles to combine into larger units both at the point of entrance into the liquid and during passage through the liquid. These factors act against the establishment of a saturated gas for if a certain fraction of the bubbles have sizes that have been greatly increased by combination these bubbles will tend to be less saturated than the smaller ones and the gas after leaving the liquid will tend to be unsaturated.

It is the purpose of this invention to establish conditions where the gas passing in contact with the liquid-solid combination will do this in a fashion that insures maximization of the gas surface in contact with the liquid-solid so that this surface will be far greater than any that might be produced by breaking the gas into bubbles. More precisely, it is the purpose of this invention to establish conditions whereby the gas passes, in contact with the liquid-solid combination, in a form which approaches a sheet of infinitesimal thickness so that the gas-liquid surface, or the gas-liquid-solid surface, tends to a maximum and under these conditions, which are maintained throughout the finite path of passage of the gas, evaporation of the liquid into the gas or interaction of the gas with the liquid and/or the solid proceeds in a most efficient fashion.

FIG. 1 shows a prior art sparging device.

Figure 2:
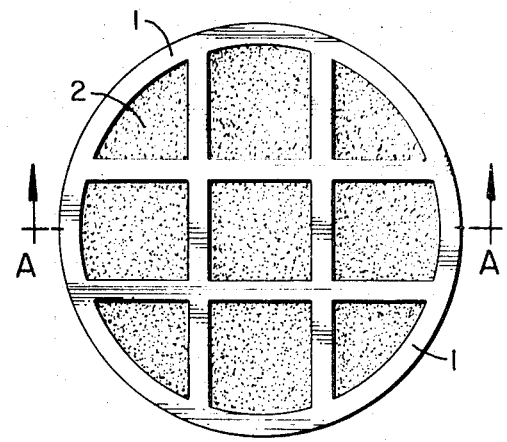
Figure 3:
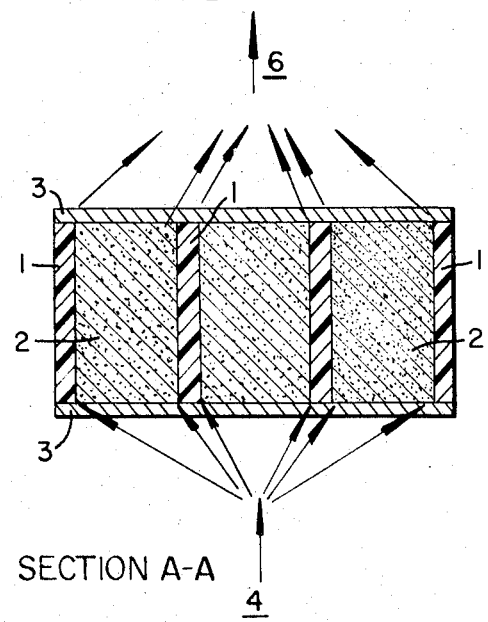
Figure 4:
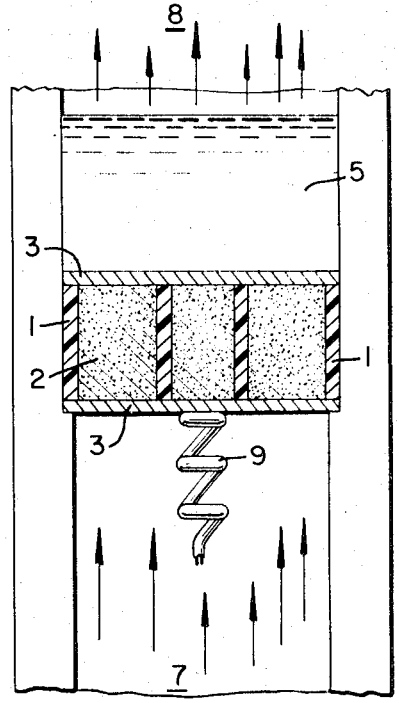

In FIG. 2 there is shown a plan view of an example of the present invention. FIG. 3 shows a sectional view of FIG. 2 taken between the points indicated by the arrows at A—A. FIG. 4 shows a sectional view of the device within a contact column. Although the principles of operation are quite general, we shall herein discuss materials which apply to both of the examples previously given.

In the above utilization of this invention, the liquid is located in the area above 3 as shown in FIG. 4 and is drawn by capillary action to fill the space between the silver powder granules which are designated by 2 and which are supported by the porous material, in this case silver, at 3. The material of 1 is such that it is not wetted by the liquid and in the present example where we take the liquid as an aqueous solution of potassium hydroxide, this material is Teflon.

Under the conditions noted the gas must break a multiplicity of capillary bonds in order to pass through the granular silver where this material is not at a Teflon boundary 1. On the other hand, since the Teflon tends to be not wetted by the liquid, the gas can pass as an infinitesimal sheath through the surface of separation of the Teflon and the alkali solution which is in contact with the silver powder and this is the path which it chooses wherein it enters from the space 7 of FIG. 4 at points such as 4 of FIG. 3 and it leaves at points such as 6 of FIG. 3 passing into space 8 of FIG. 4 and upward. As seen in FIG. 3, the Teflon is set internally as well as at the outer surface.

It is clear that where one is interested only in humidification of the gas, the liquid 5 can be water and the powder need not be silver. But, on the other hand, it is a simple matter to establish an external electrical connection 9 to the silver powder 2 and, under these conditions, it can be used as the cathode of an analyzer for the measurement of trace oxygen. When used in this fashion it permits quantitative analysis over a wide range.

What is claimed is:

1. An enclosure through which a gas may pass having a powder which is wetted by a liquid and including separating and/or boundary surfaces with the liquid-powder medium of solid material which is not wetted by the liquid, these surfaces being predominantly in the direction along which it is desired that the gas should pass.

2. An enclosure of the type of claim 1 wherein the powder is a metal.

3. An enclosure of the type of claim 2 including a means for making electrical contact to the metal powder.

4. An enclosure through which a gas may pass having a finely granular material which is wetted by a liquid and including separating and/or boundary surfaces with the liquid-finely granular material medium of solid material which is not wetted by the liquid, these surfaces being predominantly in the direction along which it is desired that the gas should pass.

5. An enclosure of the type of claim 2 wherein the finely granular material is a metal.

6. An enclosure of the type of claim 5 including a means for making electrical contact to the finely granular material.

References Cited

UNITED STATES PATENTS

| | | | |
|---|---|---|---|
| 268,174 | 11/1882 | Blanchard | 136—86UX |
| 1,182,759 | 5/1916 | Emanuel | 136—86 |
| 3,419,900 | 12/1968 | Elmore et al. | 136—86 |
| 2,541,838 | 2/1951 | Shardlow | 55—524X |
| 2,774,585 | 12/1956 | Wirts | 261—122 |
| 2,898,282 | 8/1959 | Flook, Jr., et al. | 204—1(.1)X |

FRANK W. LUTTER, Primary Examiner

U.S. Cl. X.R.

55—524; 136—86, 120; 204—1